Aug. 30, 1955  W. W. McMULLEN  2,716,398
CRANKCASE VENTILATION VALVE INCORPORATING FLAME ARRESTER
Filed Nov. 21, 1951
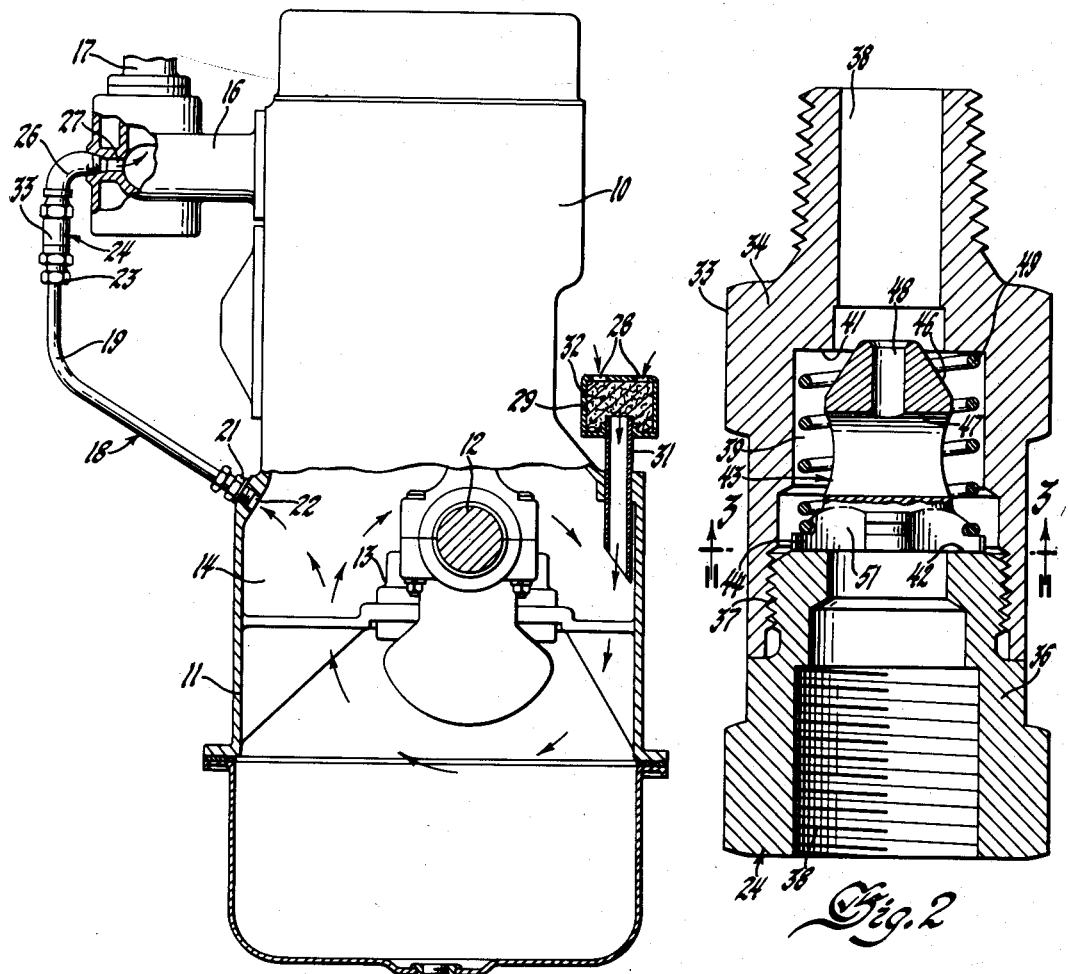
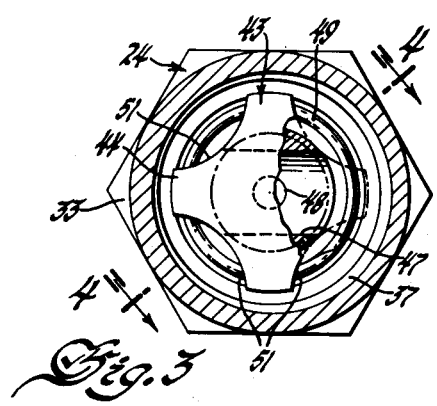
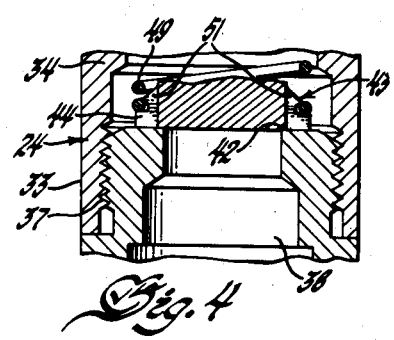
INVENTOR.
Wesley W. McMullen
BY
Willits, Helwig & Baillio
ATTORNEYS

United States Patent Office 2,716,398
Patented Aug. 30, 1955

2,716,398

CRANKCASE VENTILATION VALVE INCORPORATING FLAME ARRESTER

Wesley W. McMullen, Flint, Mich., assignor to General Motors Corporation, Detroit, Mich., a corporation of Delaware Application November 21, 1951, Serial No. 257,481

10 Claims. (Cl. 123—119)

The invention relates to control devices for regulating the flow of vaporous fluid from the crankcase or other mechanism compartment to the inlet manifold of an internal combustion engine. The invention has particular relation to devices of this character which may be employed for the additional purpose of preventing explosions or fires that may occur as a result of backfires in the inlet manifold of an engine and for improving the starting characteristics of an engine.

It has been the practice heretofore to employ conduits for connecting the crankcase and other compartments of an internal combustion engine to the inlet manifold thereof. When these conduits are employed, the crankcase and other vaporous fluids formed by operation of the engine will tend to flow into the inlet manifold in response to the difference in pressure caused by the inlet manifold vacuum. Valves have been employed in these conduits for so regulating the flow of these vaporous fluids as to prevent an increase in flow proportional to increases in inlet manifold vacuum that occur under various conditions of operation of the engine. These valves have been constructed in such a way as to tend to restrict the rate at which these vaporous fluids may flow into the inlet manifold as the inlet manifold vacuum increases. Such restricted flow has been found to be suitable for the purpose of exhausting these vaporous fluids from the crankcase and elsewhere in an engine where such vapors may be formed, but since the valves merely restrict the flow without at any time closing the passage, there have been found to be certain objections to such systems.

It is now proposed to provide a system for exhausting the crankcase and other vapors within various compartments in an internal combustion engine without encountering these objectionable features. It is proposed to employ a conduit between the crankcase and inlet manifold of an engine including a valve capable of both restricting and closing the conduit. This valve is spring pressed toward one seat formed in the body of the valve and fluid pressure actuated toward another. When the valve moves in such a way as to extend the spring, the valve will close the conduit completely. When the valve moves in response to the flow of fluid from the crankcase to the inlet manifold of the engine the valve will restrict the flow of fluid in such a way as to prevent an increase in flow proportional to increases in inlet manifold vacuum. The initial spring load on the valve is sufficient to substantially prevent opening of the valve during the cranking of the engine so that the mixture available for starting the engine will not be diluted by crankcase vapors. The valve also will be closed by a backfire which may occur in the inlet manifold. When the valve does close the valve in response to any such backfire, it will be apparent that the hazard involved in fires or explosions in the crankcase of the engine or elsewhere will be greatly reduced. The closing of the valve will effectively prevent any flame from being conducted to the crankcase or elsewhere in the engine as a result of any such backfire.

In the drawing:

Figure 1 is a view partly in end elevation and partly in vertical cross section of an internal combustion engine having a crankcase ventilating system embracing the principles of the invention.

Figure 2 is a longitudinal sectional view through a flow controlled valve employed in the crankcase ventilating system disclosed by Figure 1.

Figure 3 is a cross sectional view of the valve taken substantially in the plane of line 3—3 on Figure 2 looking in the direction of the arrows thereon.

Figure 4 is a fragmentary longitudinal sectional view of the valve taken substantially in the plane of line 4—4 on Figure 3.

Figure 1 illustrates an internal combustion engine 10 having a crankcase 11 in which a crankshaft 12 is rotatably mounted upon bearings 13 formed in webs 14 and in the end walls of the crankcase at opposite ends of the engine. One or more of the webs 14 may divide the upper part of the crankcase into a plurality of downwardly opening compartments but these compartments all communicate with one another through the space within the crankshaft and below the webs. The crankcase 11 also may be considered to include any other space or compartment within the engine where objectionable vaporous fluid or gases may collect. Such spaces or compartments may contain valve stems, camshafts, timing gears, rocker arms and other mechanical elements of the engine and may or may not be connected directly to the crankcase.

The engine also is provided with an inlet manifold 16 connected to a carburetor outlet 17 through which an explosive charge for operating the engine may be supplied to the interior of the inlet manifold 16. The interiors of the inlet manifold and of the crankcase or other engine compartment may be placed in communication by a conduit indicated generally at 18. The conduit 18 comprises a tube 19 having one end thereof connected by a fitting 21 to the interior of the crankcase 11 through an opening 22. The opposite end of the tube 19 is connected by a fitting 23 to a flow control valve indicated at 24. The opposite end of the flow control valve 24 is connected by an elbow 26 to the interior of the inlet manifold 16 through an opening 27.

Air for displacing the vaporous fluid exhausted from any compartment of the engine may be supplied by any suitable opening. For such purposes, air may be supplied to the crankcase 11 through openings 28 formed in a filler cap 29 removably secured upon the upper end of a filler tube 31 with which the crankcase 11 may be provided. The cap 29 may be removed for the purpose of filling the crankcase with oil through the tube 31. The cap 29 also may be provided with filtering material 32 for the purpose of cleaning the air supplied to the crankcase 11.

When the invention is used with an overhead valve engine it may be desirable also to employ a cap similar to the cap 29 on the rocker arm cover employed. Under such circumstances air may be admitted to the rocker arm cover and then conducted to the crankcase through the compartment containing the push rods of the engine. It may also be desirable in any engine to connect each compartment to the inlet manifold by a direct connection or by a single connection having a plurality of conduits such as the conduit 19 connected to each compartment.

The flow control valve 24 connected between the elbow 26 and the conduit 19 comprises a valve body 33 consisting of body members 34 and 36 threaded together as indicated at 37. The valve body 33 has an elongated passage 38 extending from one end to the other thereof and including an enlarged centrally disposed valve chamber indicated at 39. The opposite ends of the valve chamber 39 are formed in such a way as to provide annular valve seats indicated at 41 and 42. Located within the valve chamber 39 is a valve member 43 having an outwardly projecting annular shoulder 44 having an annular end surface parallel to the valve seat 42. The valve member 43 is closed within the annular shoulder 44 so that the valve member will close the passage 38 when the end surface of the shoulder 44 rests upon the seat 42. The opposite end of the valve member 43 is formed in such a way as to provide a tapering annular shoulder indicated at 46. The length of the valve member 43 is such that the closure means provided by the tapering shoulder 46 will not seat against the edge of the seat 41 when the valve member is seated upon the seat 42. The valve member 43 therefore will remain open with respect to one of the seats 41 or 42 when it is closed on the other. In order to prevent the valve member 43 from entirely closing the passage 38 when the shoulder 46 is closed with respect to the seat 41 the valve member 43 is provided with a transverse passage 47 intersected by a longitudinal passage indicated at 48. The passage 48 extends from the passage 47 to the end of the valve member 43 which is located beyond the tapering shoulder 46. The valve member 43 tends to remain closed upon the seat 42 in response to the operation of a spring 49 compressed within the valve chamber 39 between the shoulder 44 and the outer surface of the seat 41.

Referring particularly to Figures 3 and 4 it will be apparent that the shoulder portion 44 of the valve member 43 is cut out in such manner as to provide a plurality of arcuate slots 51 extending inwardly from the outer periphery of the shoulder 44 in such a way that the inner extremities thereof terminate just beyond the outer extent of the passage 38 within the seat 42. The end of the spring 49 is supported upon the portions of the shoulder 44 that extend outwardly between the arcuate slots 51. It will be apparent from examining Figures 3 and 4 that immediately upon movement of the valve member 43 away from the seat 44 it will be possible to establish communication from one end to the other of the passage 38 through the arcuate slots 51.

The spring 49 is initially compressed between the valve body 33 and the shoulder 44 to such an extent that the valve member 43 will not open the passage 38 until there is a predetermined difference in pressure between the interior of the crankcase 11 and the interior of the inlet manifold 16. This difference in pressure may vary to any desired extent depending upon the design of the engine 10 but it is considered desirable in some instances to have the valve member 43 remain closed upon the seat 42 at least during the starting of the engine in cold weather. Under such circumstances the starter will not crank the engine as fast as it will in warm weather or after the engine is warm. This slow cranking of the engine will not create as great an inlet manifold vacuum as will a faster cranking operation and if the valve 43 is allowed to remain closed upon the seat 42 it will be apparent that a richer mixture will be supplied to the engine. Such richer mixture will improve the starting of the engine during colder weather.

While the spring 49 is strong enough to hold the valve member 43 closed on the seat 42 during the cold starting of the engine, the spring is not strong enough to resist the opening movement of the valve member under other conditions of operation of the engine. For example, as soon as the engine starts, the difference in pressure between the inlet manifold and the crankcase will cause the vaporous fluid to tend to flow through the valve 24 at a considerable rate. This eventually will move the valve member 43 from a position in which it is seated upon the seat 42 to a position to which it is seated upon the seat 43. However, if the valve member 43 does not close the passage 38 when it is seated upon the seat 41 because fluid will continue to flow from the crankcase to the inlet manifold through the by-pass passage 48. However, the by-pass passage 48 is considerably smaller than any other passage where fluid may flow around the valve body 43 and consequently it will restrict the flow of fluid from the crankcase to the inlet manifold during conditions of operation of the engine when the inlet manifold vacuum is of the highest value.

After the throttle of the engine is open beyond the starting position, there will be a tendency for the inlet manifold vacuum to progressively decrease. It is therefore desirable to so calibrate the spring 49 that this decrease in inlet manifold vacuum will cause the valve body 43 to move away from the seat 41. This movement of the valve body 43 away from the seat 41 will provide a small annular opening between the seat 41 and the frusto-conical surface 46 which will provide a passage through the valve in addition to the by-pass passage 48. This annular passage will enlarge as the inlet manifold vacuum decreases but the valve body 43 will not move far enough to restrict the flow between the opposite end thereof and the seat 42 during any operating condition of the engine. During engine operation, the valve body 43 will merely float between the seats 41 and 42 in such a way as to increase the size of the passage around the valve body as the inlet manifold vacuum decreases from a maximum to a minimum value. This increase in the size of the passage around and through the valve body 43 is intended to increase the rate of flow of gas from the crankcase to the engine. What is desired is that the rate of flow of fluid from the crankcase to the engine should increase at low manifold vacuum and decrease at higher manifold vacuum in the engine.

Should the engine stop, it will be apparent that the spring 49 will immediately move the valve body 43 into contact with the seat 42 to completely close the passage 38. Should a backfire occur during the operation of the engine this will cause the fluid pressure to instantaneously increase in the inlet manifold of the engine and this increase in pressure will instantaneously seat the valve member 43 upon the seat 42. This will completely close the passage 38 which normally provides communication between the inlet manifold and the crankcase of the engine and it will be impossible for the flame causing the backfire to travel through the conduit 18 from the inlet manifold to the crankcase of the engine. Consequently no fires or explosions will result in the crankcase or any other part of the engine connected to the inlet manifold 16 through the valve 24 when a backfire may occur.

I claim:

1. A flow control device for crankcase ventilating systems in internal combustion engines comprising, a valve body having a passage therethrough, conduit means for connecting said passage between the inlet manifold and the crankcase of an internal combustion engine, a pair of spaced valve seats formed in said valve body within said passage, a valve within said passage between said seats, said valve having closure means adapted alternately to engage said seats when said valve is moved in opposite directions within said passage, resilient means tending to move said valve in one direction to engage one of said seats for closing said passage against the flow of fluid from said crankcase to said manifold, said resilient means being calibrated in relation to the inlet manifold vacuum in said engine to retain said valve on said seat during the cold starting of said engine.

2. A flow control device for the crankcase ventilating system of an internal combustion engine comprising, a valve body having a passage therethrough, said valve body being adapted to be connected by conduit means between the crankcase and the inlet manifold of an internal combustion engine, a valve having oppositely disposed valve closure means formed thereon and disposed in said passage, a pair of valve seats formed in said valve body in spaced and opposed relation to said valve closure means to permit the movement of said valve in said passage alternately in opposite directions and into engagement with one or the other of said seats, resilient means tending to oppose the closing of said valve against one of said seats in response to the flow of fluid in said passage and tending to close said valve against the other of said seats and against the flow of said fluid, and a by-pass opening formed in said valve across one of said closure means and permitting a limited flow of fluid from said crankcase to said manifold when said valve is closed upon said one of said seats.

3. A flow control device adapted for use in a crankcase ventilating system for internal combustion engines comprising, valve body means having a passage formed therein and being adapted to be connected by conduit means between the crankcase and the inlet manifold of an internal combustion engine, valve closure means in said valve body means and being movable in opposite directions within said passage for closing oppositely disposed valve seats formed in said valve body means, a by-pass formed in one of said valve means and extending across one of said seats to permit the flow of fluid from said crankcase to said engine when said valve closure means closes upon said one of said seats, and resilient means tending to close said valve closure means against the other of said means and against said flow of fluid in said passage.

4. A flow control device for use in the ventilating system of an internal combustion engine and comprising, valve body means having a passage formed therein and being adapted to be connected by conduit means between the crankcase and the inlet manifold of an internal combustion engine, valve closure means disposed in said passage and movable in opposite directions between oppositely disposed seats formed around said passage and within said valve body means, said valve closure means having a shoulder formed at the crankcase end thereof for engagement with one of said seats, said shoulder being formed to provide a plurality of radially inwardly disposed notches therein with said notches extending inwardly across the engaging surfaces of said shoulder and said seat and terminating adjacent said passage, said notches providing a plurality of outlets around said valve closure means, a spring surrounding said valve closure means and being compressed between said body and said shoulder and tending to urge said shoulder against said seat, said valve closure means being movable against said spring by a predetermined pressure differential between said crankcase and said inlet manifold to provide for the flow of fluid across said seat and through said passages, said valve being progressively movable in response to increases in flow through said passage and into engagement with a second valve seat formed in said valve body means.

5. A flow control device for crankcase ventilating systems in internal combustion engines and comprising, a valve body having a passage therein for connection at one end to the inlet manifold of an engine and at the opposite end to the crankcase thereof, a pair of oppositely disposed annular shoulders formed in said valve body around said passage and providing an enlarged valve chamber in said passage between said seats, a valve closure member having oppositely disposed closure surfaces formed thereon, said valve being movable in one direction in said valve chamber in response to the flow of fluid from said crankcase to said inlet manifold, said movement of said valve in said one direction being adapted progressively to restrict said passage and to reduce said flow of fluid from said crankcase to said engine as said valve member approaches one of said seats, a by-pass through said valve member at the end thereof adjacent said one of said seats to provide for the limited flow of fluid from said crankcase to said inlet manifold when said valve member engages said one of said seats, a spring located in said valve chamber and compressed between said valve body and the opposite end of said valve and tending to move said valve in opposition to the flow of fluid in said passage, said valve member being adapted to engage the other of said seats for closing said passage upon a predetermined reduction in the flow of fluid from said crankcase to said inlet manifold.

6. An internal combustion engine comprising a crankcase and an inlet manifold, a conduit extending between said crankcase and said inlet manifold for exhausting vaporous fluid from said crankcase to said inlet manifold, a flow actuated valve in said conduit, said valve being movable in said conduit for reducing the flow of fluid in said conduit in response to the difference in pressure between said inlet manifold and said crankcase increases, and resilient means tending to move said valve in the opposite direction for closing said conduit.

7. An internal combustion engine comprising a valve body connected between the crankcase and inlet manifold of said engine, a valve chamber formed in said valve body, a valve member located in said chamber and adapted to move in one direction in said chamber in response to the flow of fluid from said crankcase to said inlet manifold, means associated with said valve body and said valve member for restricting the flow of fluid from said crankcase to said inlet manifold in response to the flow of fluid therein and as the inlet manifold vacuum in said engine increases, and means associated with said valve body and said valve member for closing said valve body against the flow of fluid from said inlet manifold to said crankcase when the pressure in said inlet manifold exceeds the pressure in said crankcase.

8. An internal combustion engine comprising a valve body having a passage therein connected between the crankcase and the inlet manifold of an engine, valve means associated with said valve body and tending to restrict the flow of fluid from said crankcase to said inlet manifold as the pressure in said inlet manifold decreases, and valve means associated with said valve body and tending to close said passage against the flow of fluid from said inlet manifold to said crankcase when the pressure in said inlet manifold exceeds a predetermined value.

9. An internal combustion engine comprising a valve body connected between the crankcase and the inlet manifold of said engine, flow actuated valve means in said valve body for restricting the flow of fluid from said crankcase to said inlet manifold as the pressure in said crankcase increases with respect to the pressure in said inlet manifold a by-pass formed in said body around said flow actuated valve means, and valve means associated with said valve body for closing said valve body against the flow of fluid from said inlet manifold to said crankcase when a backfire occurs in said inlet manifold.

10. An internal combustion engine comprising a valve body connected between the crankcase and the inlet manifold of said engine, flow actuated valve means associated with said valve body for restricting the flow of fluid through said valve body from said crankcase to said inlet manifold as the pressure in said inlet manifold decreases and resilient means for moving said flow actuated valve means into a position to close said passage when the operation of said engine is discontinued.

References Cited in the file of this patent

UNITED STATES PATENTS

| | | |
|---|---|---|
| 1,244,689 | Bell | Oct. 30, 1917 |
| 2,245,271 | Guill | June 10, 1941 |
| 2,423,592 | Foster | July 8, 1947 |